US012688432B2

(12) United States Patent
Yoo et al.

(10) Patent No.: US 12,688,432 B2
(45) Date of Patent: Jul. 21, 2026

(54) EXPLORATION METHOD AND APPARATUS IN MULTI-AGENT REINFORCEMENT LEARNING

(71) Applicant: ELECTRONICS AND TELECOMMUNICATIONS RESEARCH INSTITUTE, Daejeon (KR)

(72) Inventors: Byunghyun Yoo, Daejeon (KR); Hyun Woo Kim, Daejeon (KR); Jeon Gue Park, Daejeon (KR); Hwa Jeon Song, Daejeon (KR); Jeongmin Yang, Daejeon (KR); Sungwon Yi, Daejeon (KR); Euisok Chung, Daejeon (KR); Ran Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 902 days.

(21) Appl. No.: 17/893,628

(22) Filed: Aug. 23, 2022

(65) Prior Publication Data

US 2023/0186154 A1     Jun. 15, 2023

(30) Foreign Application Priority Data

Dec. 13, 2021     (KR) ........................ 10-2021-0177364

(51) Int. Cl.
  *G06N 3/092*     (2023.01)
  *G06N 20/00*     (2019.01)
(52) U.S. Cl.
  CPC ............. *G06N 3/092* (2023.01); *G06N 20/00* (2019.01)

(58) Field of Classification Search
  None
  See application file for complete search history.

(56) References Cited

U.S. PATENT DOCUMENTS 11,480,972 B2 * 10/2022 Naghshvar ........... G05D 1/0231
12,428,946 B2 *  9/2025 Pournazari .............. E21B 44/02
(Continued)

FOREIGN PATENT DOCUMENTS

KR     10-2019-0087023 A     7/2019
KR        10-2267316 B1     6/2021

OTHER PUBLICATIONS

Postels, Janis et al. Sampling-free Epistemic Uncertainty Estimation Using Approximated Variance Propagation. Dec. 2, 2019. International Conference on Computer Vision 2019. <https://doi.org/10.48550/arXiv.1908.00598> (Year: 2019).*
(Continued)

*Primary Examiner* — Tamara T Kyle
*Assistant Examiner* — Tyler Schallhorn
(74) *Attorney, Agent, or Firm* — Rabin & Berdo, P.C.

(57)     ABSTRACT

An exploration method used by an exploration apparatus in multi-agent reinforcement learning to collect training samples during the training process is provided. The exploration method includes calculating the influence of a selected action of each agent on the actions of other agents in a current state, calculating a linear sum of the value of a utility function representing the action value of each agent and the influence on the actions of the other agent calculated for the selected action of each agent, and obtaining a sample to be used for training an action policy of each agent by probabilistically selecting the action in which the linear sum is the maximum, and the random action.

4 Claims, 4 Drawing Sheets

(56) References Cited

U.S. PATENT DOCUMENTS

| | | | | |
|---|---|---|---|---|
| 2020/0150672 A1* | 5/2020 | Naghshvar | ............. | G06N 3/006 |
| 2020/0160168 A1 | 5/2020 | Yang et al. | | |
| 2020/0167611 A1 | 5/2020 | Yoon et al. | | |
| 2020/0202272 A1* | 6/2020 | Aravamudhan | ......... | G06N 3/08 |
| 2020/0308952 A1* | 10/2020 | Pournazari | .............. | G06N 7/01 |
| 2021/0073912 A1* | 3/2021 | Da Silva | ............... | G06N 3/088 |
| 2021/0168827 A1 | 6/2021 | Shin | | |

OTHER PUBLICATIONS

Wan, Lipeng et al. Greedy-based value representation for optimal coordination in multi-agent reinforcement learning. Dec. 8, 2021 <https://doi.org/10.48550/arXiv.2112.04454> (Year: 2019).*

Yi, Sungwon. Foundational Aspects of Machine Learning in Multi-agent Online Games as Serious Games. <https://apps.dtic.mil/sti/html/trecms/AD1152078/> (Year: 2021).*

Rashid, T. et al., "Weighted QMIX: Expanding Monotonic Value Function Factorisation for Deep Multi-Agent Reinforcement Learning", 34th Conference on Neural Information Processing Systems (NeurIPS 2020), Vancouver, Canada, pp. 1-20.

Wang, T. et al., "Influence-Based Multi-Agent Exploration", ICLR 2020 Conference, pp. 1-23.

Yoo, B. et al., "A Novel and Efficient Influence Seeking Exploration in Deep Multi-Agent Reinforcement Learning", IEEE Access, vol. 4, pp. 1-11, 2021.

Liu, Iou-Jen, et al., 'Cooperative Exploration for Multi-Agent Deep Reinforcement Learning', ICML 2021, pp. 1-18, Jul. 23, 2021.

Zheng, Lulu, et al., 'Episodic Multi-agent Reinforcement Learning with Curiosity-driven Exploration', Advances in Neural Information Processing Systems, 2021.

* cited by examiner

FIG. 2

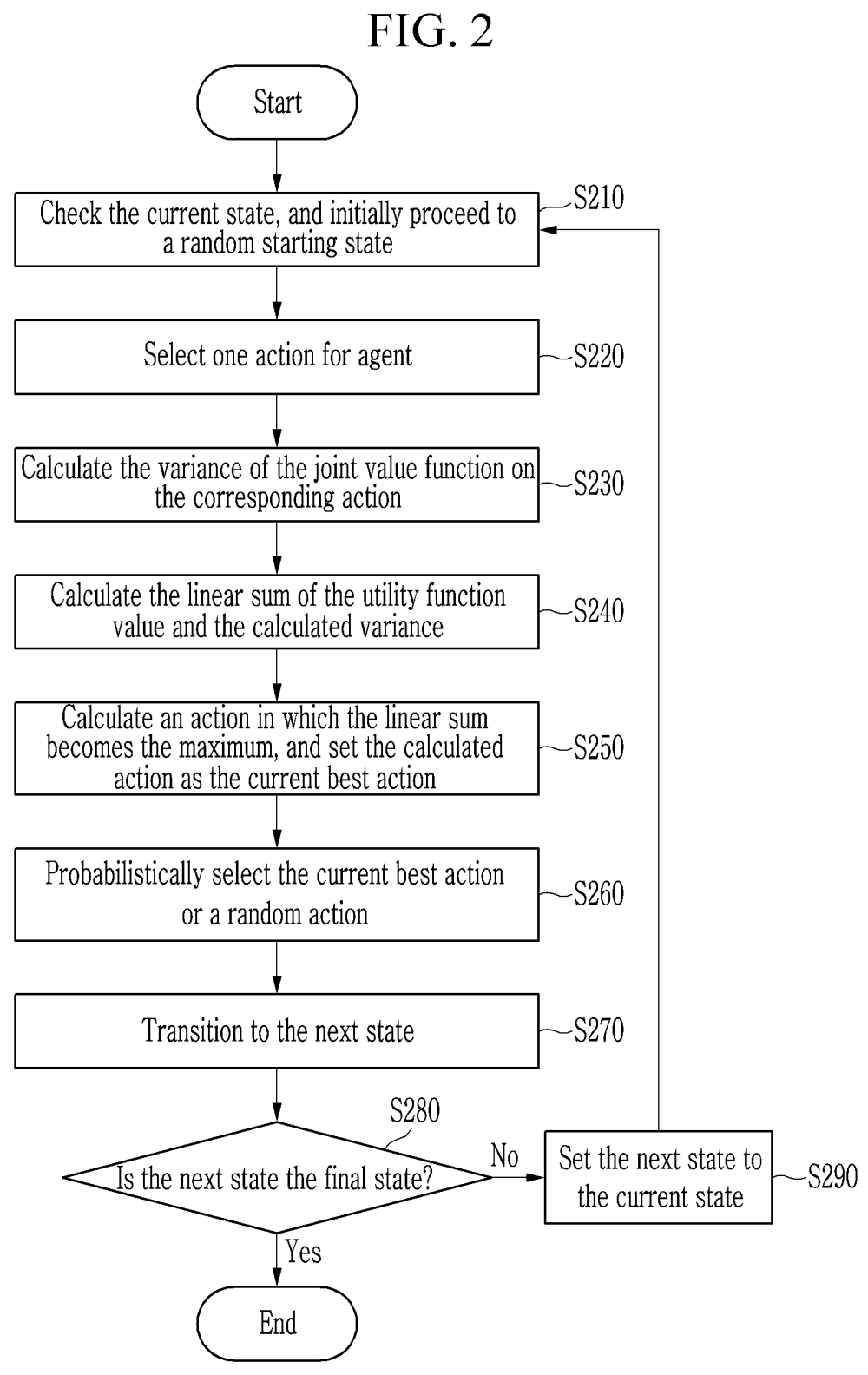

Start

↓

Check the current state, and initially proceed to a random starting state ⟶ S210

↓

Select one action for agent ⟶ S220

↓

Calculate the variance of the joint value function on the corresponding action ⟶ S230

↓

Calculate the linear sum of the utility function value and the calculated variance ⟶ S240

↓

Calculate an action in which the linear sum becomes the maximum, and set the calculated action as the current best action ⟶ S250

↓

Probabilistically select the current best action or a random action ⟶ S260

↓

Transition to the next state ⟶ S270

↓

S280

Is the next state the final state?  — No → Set the next state to the current state ⟶ S290

↓ Yes

End

EXPLORATION METHOD AND APPARATUS IN MULTI-AGENT REINFORCEMENT LEARNING

CROSS-REFERENCE TO RELATED APPLICATION

This application claims priority to and the benefit of Korean Patent Application No. 10-2021-0177364 filed in the Korean Intellectual Property Office on Dec. 13, 2021, the entire contents of which are incorporated herein by reference.

BACKGROUND OF THE INVENTION

(a) Field of the Invention

The present disclosure relates to an exploration method and apparatus in multi-agent reinforcement learning, and more particularly, to an exploration method and apparatus in multi-agent reinforcement learning for obtaining efficient learning samples in a vast action space.

(b) Description of the Related Art

Multi-agent reinforcement learning technology is a technology to find the optimal policy to achieve a goal through efficient collaboration between agents in an environment where multiple agents exist.

Unlike the existing single-agent reinforcement learning technology, since the multi-agent reinforcement learning technology has multiple agents, the combination of actions of the agent actions also increases exponentially, and accordingly, it is necessary to explore a vast size of action space.

In general, the multi-agent reinforcement learning is operated under the assumption that observation information of all agents is used during the training process, and each agent executes only using its own observation information in the execution process in which learning is completed and actually operated. This approach is called the Centralized Training and Decentralized Execution (CTDE) paradigm. Under this paradigm, the existing methods follow the value function-based method, but learn a joint value function that takes all agent information as input, and decompose the joint value function into an individual utility function that uses observation information of each agent as input. Individual utility functions act like individual value functions for each agent.

The method shows excellent performance in a scenario in which it is not difficult to find an optimal policy due to low difficulty, but has low performance in a high difficulty or relatively complex environment. One of the reasons for the low performance is because in this method the exploration technique for obtaining training samples selects behaviors with high individual utility function values or this method follows the Epsilon Greedy (e-greedy) method in which random behaviors are selected.

Recently, exploration techniques for obtaining various behavioral samples have been proposed, but an exploration technique that considers the influence between agents in a value function-based method has not been proposed.

SUMMARY OF THE INVENTION

The present disclosure has been made in an effort to provide an exploration method and apparatus in multi-agent reinforcement learning capable of obtaining efficient learning samples in a vast action space in consideration of the influence between agents in multi-agent reinforcement learning.

According to an exemplary embodiment, an exploration method used by an exploration apparatus in multi-agent reinforcement learning to collect training samples during the training process is provided. The exploration method includes: calculating the influence of a selected action of each agent on the actions of other agents in a current state; calculating a linear sum of the value of a utility function representing the action value of each agent and the influence on the actions of the other agent calculated for the selected action of each agent; and obtaining a sample to be used for training an action policy of each agent by probabilistically selecting the action in which the linear sum is the maximum and the random action.

The calculating the influence may include calculating a variance value of a joint value function for the actions of other agents while fixing the selected action of each agent, and the joint value function may estimate an expected return of the cumulative reward by inputting information on the states and actions of all agents.

The calculating of the variance value may include calculating the variance value using an approximated variance propagation technique.

The calculating of the variance value may include: defining a variance of the actions of each agent as a variance of an input; and propagating the variance of the input to a variance of an output through a variance propagation technique.

The calculating the influence may include obtaining observation information and action information in the current state from each agent.

The exploration method may further include: transitioning to a next state after each agent has taken the selected action in the current state; reflecting a reward for the selected action to the utility function of the corresponding agent; and performing the calculating of the influence, the calculating of a linear sum, and the obtaining of the sample.

According to another embodiment, an exploration apparatus in multi-agent reinforcement learning multi agent is provided. The exploration apparatus includes: an information obtainer that obtains observation information and action information of each agent; an agent influence calculator that calculates the influence received from the actions of other agents for a selected action of each agent in a current state; and an action explorer that calculate a linear sum of the value of the utility function representing the action value of each agent and the influence received from the actions of the other agent calculated for the selected action of each agent, and obtains a sample to be used for training an action policy of each agent by probabilistically selecting the action in which the linear sum is the maximum and the random action.

The agent influence calculator may calculate a variance value of a joint value function for the actions of other agents while fixing the selected action of each agent as the influence, and the joint value function may estimate an expected return of the cumulative reward by inputting information on the states and actions of all agents.

The agent influence calculator may define the variance of the actions of each agent as a variance of an input, and may calculate the variance value by using a method of propagating the variance of the input to a variance of an output through a variance propagation technique.

The information obtainer, the agent influence calculator, and the action explorer may be sequentially and repeatedly executed according to a state transition of each agent in a training process.

BRIEF DESCRIPTION OF THE DRAWINGS

FIG. 2 is a flowchart illustrating a process of obtaining learning samples using an exploration method based on influence between agents in an exploration apparatus in multi-agent reinforcement learning according to an embodiment.

DETAILED DESCRIPTION OF THE EMBODIMENTS

Figure 1:
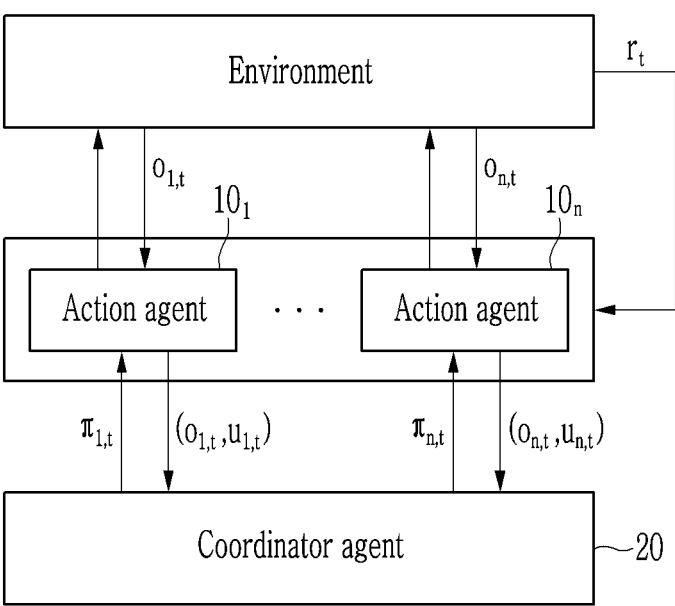
FIG. 1 is a diagram schematically illustrating multi-agent reinforcement learning.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, an exploration method and apparatus in multi-agent reinforcement learning according to an embodiment will be described in detail with reference to the drawings.

FIG. 1 is a diagram schematically illustrating multi-agent reinforcement learning.

Referring to FIG. 1, multi-agent reinforcement learning learns an action policy in which two or more agents 10₁ to 10ₙ can obtain high rewards through collaboration or competition in a given environment.

A system for multi-agent reinforcement learning may include a plurality of action agents 10₁ to 10ₙ that actually take actions and a coordinator agent 20 that receives information transmitted from the action agents 10₁ to 10ₙ and plays a coordination role.

The multi-agent reinforcement learning uses the Centralized Training and Decentralized Execution method in which the observation information of all agents is used during the training process and each agent executes only using its own observation information in the execution process in which learning is completed and actually operated.

The action agents $10_1$ to $10_n$ are substantially placed in the environment, perform actions according to the learned action policy, and receive rewards for the actions performed. Each action agent $10_1$ to $10_n$ determines the action $u_{1,t}$ to $u_{n,t}$ to be performed in the action space according to the optimal policy at at each time-step t, uses the partial observation information $o_{1,t}$ to $o_{n,t}$ from the environment and the action history information it has performed in the past, and receives a reward rt for the action $u_{1,t}$ to $u_{n,t}$ performed. Each action agent $10_1$ to $10_n$ provides partial observation information $o_{1,t}$ to $o_{n,t}$ and the determined action information $u_{1,t}$ to $u_{n,t}$ to the coordinator agent 20. In addition, each action agent $10_1$ to $10_n$ provides a reward $r_1$ received from the environment to the coordinator agent 20.

The coordinator agent 20 is a virtual agent that does not appear in the environment, and collects information on all action agents $10_1$ to $10_n$ in the environment, and controls the action policies of the action agents $10_1$ to $10_n$. The coordinator agent 20 receives partial observation information, action information, and rewards from the action agents $10_1$ to $10_n$, and learns a joint value function with information of all these agents $10_1$ to $10_n$ as input. In addition, the coordinator agent 20 calculates the influence between the action agents, and learns the action policy of each agent so that an action that is highly influenced by other agents is explored first by reflecting the influence between the action agents in the exploration method, in order to efficiently explore the large-sized action space during the training process. In general, the action policy of each agent is learned in the direction of maximizing the expected return of the cumulative reward. The policy that maximizes the expected return of the cumulative reward becomes the optimal policy.

In order to perform an action exploration based on influence between agents in multi-agent reinforcement learning, the influence between agents is first defined in the presence of multiple agents.

When one agent performs a specific action, the influence received by other agents can be defined as the variance of the expected return of the cumulative reward according to the action change of other agents. The expected return of the cumulative reward is a value that is difficult to know before learning, so a joint value function is used during the training process. The joint value function represents a function that estimates the expected return of the cumulative reward by receiving information about the states and actions of all agents as input.

As a result, the variance of the values of the joint value function according to the actions of other agents is defined as the influence on other agents, and can be expressed as Equation 1.

$$\sigma_i^2 \approx \frac{1}{M_{-i}} \sum_{m=1}^{M_{-i}} (Q_{jt}(u_i, u_{-i,m}) - \mu_i)^2 \qquad \text{(Equation 1)}$$

Here, $Q_{jt}$ denotes a joint value function, $u_i$ denotes the action of the i-th agent, and $u_{-i}$ denotes the action of all agents except the i-th agent. Mi represents the number of combinations of actions of different agents, and $\sigma_i$ represents the variance of the joint value function according to actions of other agents with respect to the i-th agent. Also, $\mu_i$ represents the average of the joint value function according to the actions of other agents with respect to the i-th agent, and can be expressed as Equation 2.

$$\mu_i = \frac{1}{M_{-i}} \sum_{m=1}^{M_{-i}} Q_{jt}(u_i, u_{-i,m})$$ (Equation 2)

In order to accurately calculate Equation 1, it is necessary to calculate the mean and variance of the joint value function for all combinations of actions of other agents. As the number of agents and the number of actions increases, the number of combinations of actions of different agents increases exponentially. Therefore, a level of calculation that is difficult to apply in practice is required.

To make the calculation of Equation 1 realistically possible, the present disclosure uses an approximated variance propagation technique. The approximate variance propagation technique is a technique to propagate the variance at the input to the variance at the output using the covariance of the input and the Jacobian of the function.

Equation 3 is an example of an approximate variance propagation technique, and represents an approximate variance propagation technique in a bivariate function.

$$\sigma_f^2 \approx \left(\frac{\partial f}{\partial x}\right)^2 \sigma_x^2 + \left(\frac{\partial f}{\partial y}\right)^2 \sigma_y^2 + 2\frac{\partial f}{\partial x}\frac{\partial f}{\partial y}\sigma_{xy}$$ (Equation 3)

Here, $\sigma f^2$ represents the variance at the output, $\sigma_x$ represents the variance of the input variable x, and $\sigma_y$ represents the variance of the input variable y. $\sigma_{xy}$ represents the covariance of input variables x and y, and f represents a mapping function that maps input and output.

Even in the case of a multivariable function having three or more input variables, Equation 3 can be extended and applied to fit a plurality of variables. However, when a deep neural network is used as a mapping function, it is difficult to directly apply Equation 3 because it is necessary to calculate a variance value propagated to each layer of the deep neural network.

In the present disclosure, in order to apply a deep neural network function as a mapping function, a method of calculating a Jacobian matrix of a function and a covariance matrix for each layer of a deep neural network and propagating the calculated result to the next layer is applied. Equation 4 represents an equation for propagating the variance according to the layer of the deep neural network.

$$\sum^l \approx J_{l-1} \sum^{l-1} J_{l-1}^T$$ (Equation 4)

Here, $\Sigma^l$ represents the covariance matrix in the I-th layer, and $J_{l-1}$ represents the Jacobian matrix for function mapping between the (l−1)-th layer and the l-th layer. The activation function, which is a non-linear element in the deep neural network function, is linearized through the Jacobian matrix in each layer of the deep neural network.

When only the variance at the input is defined, the variance at the input can be propagated as the variance at the output of the deep neural network function through Equation 4.

In a multi-agent reinforcement learning environment, the input that can change the learning samples obtained during the training process is the actions of the agents. Therefore, the variance at the input can be defined as the variance of actions of the agents. The learning sample may refer to a series of processes in which an action is selected in one state, receives a reward, and moves to the next state. In the continuous action space, the variance for the actions is calculated directly and used as the variance of the input. When the environment in question has a discrete action space or there is a categorical type of action, it is difficult to directly calculate the variance of the actions because similar numerical values implying actions do not actually mean similar actions. In this case, the variance of individual utility function values for each action is used as the variance of the input, instead of directly calculating the variance of the actions. For example, actions such as "eat", "run away", "hide", etc. for the i-th agent may be difficult to numerically calculate the variance of the actions. In this case, the utility function value when the action "eat" is given as an input, the utility function value when the action "run away" is given as an input, and the utility when the action "hide" is given as an input are calculated, the variance value for the utility function values of these actions is calculated, and is used as the variance of the input.

At the input, it is assumed that there is no correlation between input factors, and the covariance at the input can be calculated as in Equation 5.

$$\sum^0 = \begin{bmatrix} v_1 & 0 & \dots & 0 \\ 0 & v_2 & \dots & 0 \\ \vdots & \vdots & \ddots & \vdots \\ 0 & 0 & \dots & v_N \end{bmatrix}$$ (Equation 5)

Here, $\sigma^0$ represents the covariance at the input, and $v_i$ represents the variance with respect to the input of the i-th agent. Since it is assumed that there is no correlation between input factors at the input, the covariance at the input is a diagonal matrix, but is calculated according to Equation 4 when propagating through each layer of a deep neural network, so the covariance matrix propagated in each layer is not a diagonal matrix.

FIG. 2 is a flowchart illustrating a process of obtaining learning samples using an exploration method based on influence between agents in an exploration apparatus in multi-agent reinforcement learning according to an embodiment.

Referring to FIG. 2, the episode starts in an arbitrary state.

The exploration apparatus in multi-agent reinforcement learning checks the current state for each agent (S210). Initially, the exploration apparatus sets and proceeds to a random starting state for each agent.

The exploration apparatus selects one action for each agent (S220). For convenience of description, agent i is described as the basis.

The exploration apparatus calculates the variance of the joint value function according to the actions of other agents except for the agent i based on Equations 4 and 5 in a state in which the action selected for the agent i is fixed (S230). The calculated variance is expressed as the influence received from other agents on the selected action of agent i.

The exploration apparatus introduces the calculated variance to the Epsilon e-greedy-based scheme.

The existing exploration method in multi-agent reinforcement learning of the Epsilon Greedy method uses a method of probabilistically selecting a random action and an action that maximizes value of the utility function serving as the action value function of each agent. Contrary to this, in the present disclosure, as shown in Equation 6, the action policy of agent i is learned in the form of probabilistically selecting one of an action in which the linear sum of the utility function value of the corresponding agent and the influence on the previously calculated agents is maximized and a random action, as shown in Equation 6. The utility function of each agent is a function that estimates the expected return of the cumulative reward by inputting only the observation information of each agent.

$$\pi_i(u_i|s_i) = \begin{cases} 1-\varepsilon & \text{if } u_i = \text{argmax}_{u_i} U_i(s_i, u_i) \\ \dfrac{\varepsilon}{|\mathcal{U}|-1} & \text{otherwise} \end{cases} \quad \text{(Equation 6)}$$

$U_i$ can be expressed as in Equation 7. Here, $\varepsilon$ may be a very small number. The use of a non-zero value for $\varepsilon$ in the training process is to give an opportunity to select a random action rather than the action in which the linear sum is maximized. In fact, learning is completed and $\varepsilon$ is set to 0 during the execution process.

$$U_i = Q_i + \beta I_i \quad \text{(Equation 7)}$$

In Equations 6 and 7, $1_i$ denotes the influence received by the agent i, $|U|_i$ denotes the size of the entire action set of one agent, and $s_i$ denotes the state of the agent i. $\pi_i$ represents the action policy of the agent i, and $\beta$ represents a user parameter that determines the weight between individual utility functions and influence.

The exploration apparatus calculates the linear sum of the utility function value for agent i and the influences in which the agent i receives received on the previously calculated agents (S240).

The exploration apparatus calculates an action in which the linear sum becomes the maximum, and sets the action in which the linear sum becomes the maximum as the current best action (S250).

The exploration apparatus probabilistically selects the current best action or a random action according to the action policy of the agent i (S260).

The agent i takes the selected action in the current state and gets a reward for it. The obtained reward value is reflected in the joint value function.

The exploration apparatus transitions to the next state for agent i (S270), and checks whether the next state is the final state (S280).

If the next state is not the final state, the exploration apparatus sets the next state to the current state (S290), and repeats steps S210 to S280.

In this way, the exploration apparatus repeats steps S210 to S280 for the agent i until the next state becomes the final state in the episode.

In addition, the exploration apparatus repeats steps S210 to 290 for a number of episodes during the training process.

Although the exploration apparatus has been described based on agent i, the action policies of other agents are learned in the same way as agent i.

The utility function of each agent is a function that estimates the expected return of the cumulative reward by inputting only the observation information of each agent. In the execution process after learning is completed, each agent selects an action using only its own utility function. In the execution process, learning is performed so that the actions selected by each agent using their utility function are the same as those selected using the joint value function.

In the training process, when the agent selects an action in the current state by step S260, the agent performs the selected action and obtains a reward on the selected action. Since the reward is reflected in the joint value function, and the joint value function is related to the utility function of each agent, the utility function of each agent also changes according to the reward.

Therefore, if steps S210 to S290 are repeated for a large number of episodes in the training process, the action policy of each agent is learned so that a sample having a large influence between the agents can be selected according to Equation 6.

Each agent receives a learned action policy during the training process, and determines the action in each state based on the corresponding action policy using the utility function in the execution process.

Figure 3:
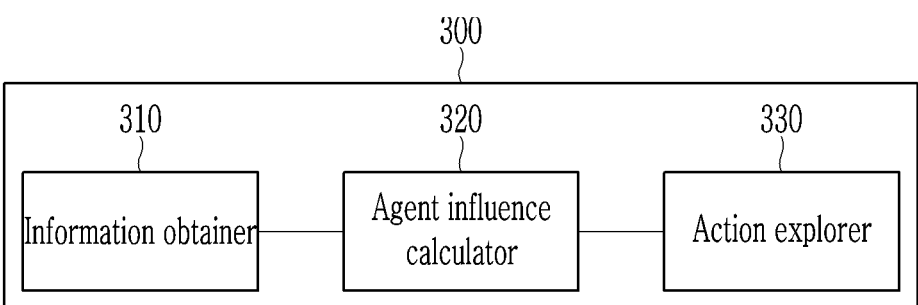
FIG. 3 is a diagram illustrating an exploration apparatus in multi-agent reinforcement learning according to an embodiment.

FIG. 3 is a diagram illustrating an exploration apparatus in multi-agent reinforcement learning according to an embodiment.

Referring to FIG. 3, the exploration apparatus 300 in multi-agent reinforcement learning includes an information obtainer 310, an agent influence calculator 320, and an action explorer 330.

The information obtainer 310 obtains information of all agents. The information obtainer 310 receives partial observation information and action information of each agent.

The agent influence calculator 320 selects one action in an arbitrary starting state for each agent, and calculates the influence that the selected action for each agent receives from actions of other agents. For this, the agent influence calculator 320 calculates the variance of the joint value function according to the actions of other agents except for the corresponding agent based on Equations 4 and 5 in a state in which the action selected for each agent is fixed.

The action explorer 330 calculates the linear sum of the individual utility function value and the previously calculated influences on the agents for each agent, and calculates the action in which the linear sum becomes the maximum.

The action explorer 330 sets the action in which the linear sum becomes the maximum as the current best action, and selects the current best action or a random action according to the action policy of each agent.

Each agent takes a selected action in the current state and obtains a reward for the selected action, and the information obtainer 310 obtains partial observation information and action information from each agent.

The information obtainer 310, the agent influence calculator 320, and the action explorer 330 are sequentially and repeatedly executed according to the state transition of each agent.

Figure 4:
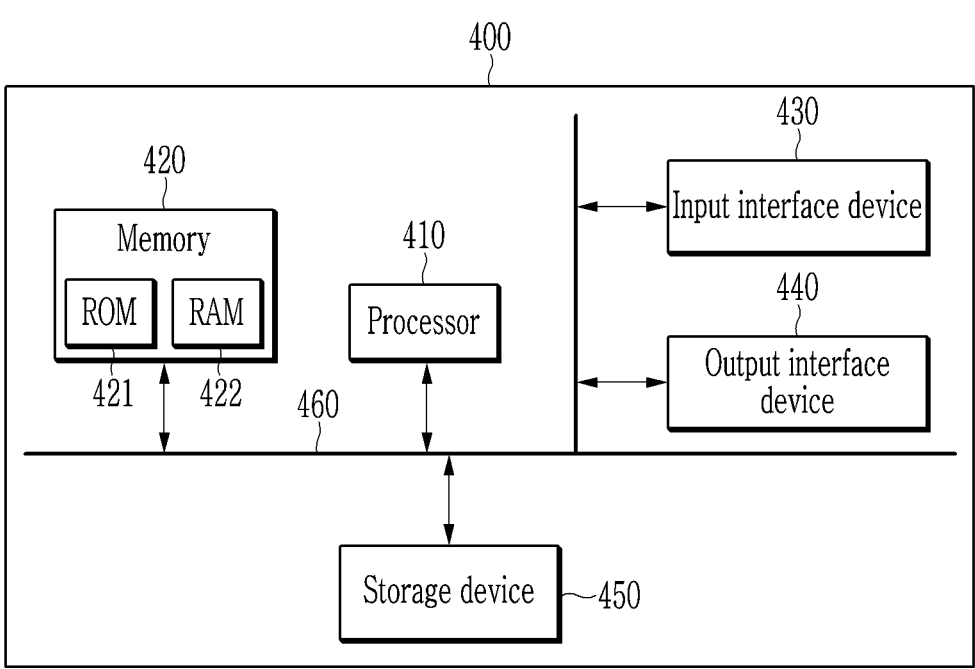
FIG. 4 is a diagram illustrating an exploration apparatus in multi-agent reinforcement learning according to another embodiment.

FIG. 4 is a diagram illustrating an exploration apparatus in multi-agent reinforcement learning according to another embodiment.

Referring to FIG. 4, an exploration apparatus 400 in multi-agent reinforcement learning may represent a computing device in which the aforementioned search method is implemented. The exploration apparatus 400 in multi-agent reinforcement learning may be implemented in the coordination agent described with reference to FIG. 1 or may be implemented in each action agent. Alternatively, the exploration device 400 in multi-agent reinforcement learning may be implemented as a separate device other than the action agent and the coordination agent.

The exploration apparatus 400 in multi-agent reinforcement learning may include at least one of a processor 410, a memory 420, an input interface device 430, an output interface device 440, and a storage device 450. Each of the components may be connected by a common bus 460 to communicate with each other. In addition, each of the components may be connected through an individual interface or a separate bus centering on the processor 410 instead of the common bus 470.

The processor 410 may be implemented as various types such as an application processor (AP), a central processing unit (CPU), a graphics processing unit (GPU), etc., and may be any semiconductor device that executes a command stored in the memory 420 or the storage device 450. The processor 410 may execute program commands stored in at least one of the memory 420 and the storage device 450. The processor 410 stores program commands for implementing at least some functions of the information obtainer 310, the agent influence calculator 320, and the action explorer 330 described with reference to FIG. 3 in the memory 420, and may control to perform the operation described with reference to FIGS. 1 to 3.

The memory 420 and the storage device 450 may include various types of volatile or non-volatile storage media. For example, the memory 420 may include a read-only memory (ROM) 421 and a random access memory (RAM) 422. The memory 420 may be located inside or outside the processor 410, and the memory 420 may be connected to the processor 410 through various known means.

The input interface device 430 is configured to provide data to the processor 410.

The output interface device 440 is configured to output data from the processor 410.

At least some of the exploration method in multi-agent reinforcement learning according to the embodiment may be implemented as a program or software executed in a computing device, and the program or software may be stored in a computer-readable medium.

In addition, at least some of exploration method in multi-agent reinforcement learning according to the embodiment may be implemented as hardware that can be electrically connected to the computing device.

According to an embodiment, by quantifying the degree of mutual influence according to the actions of agents in a multi-agent environment and reflecting them in the exploration technique, it becomes possible to explore more efficiently than the exploration method according to a utility function that simply acts as an individual value function.

In addition, by performing actively exploration for areas that have a large influence on each other due to strong interaction between agents, it can improve performance by finding the optimal policy that requires collaboration between agents faster or finding the optimal policy that is difficult to find in the conventional method.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for exploring training samples used in learning action policy applied to actions of a plurality of agents included in a multi-agent reinforcement learning system, the plurality of agents configured to perform actions according to the learned action policy, and receive rewards for the actions performed, the method comprising:

calculating, by an exploration apparatus, in a current state and while a selected action of a target agent is fixed, a variance value of a joint value function for actions of other agents, the joint value function configured to estimate an expected return of cumulative reward by taking, as inputs, observation information, action information, and reward values of all agents;

calculating, by the exploration apparatus, a linear sum of a value of a utility function of the target agent and the variance value of the joint value function for the actions of the other agents calculated for the selected action of the target agent, the utility function configured, for each agent, to estimate an expected return of cumulative reward using only observation information of respective agents as an input; and obtaining, by the exploration apparatus, a sample to be used for training an action policy of each agent by probabilistically selecting an action in which the linear sum is a maximum and a random action, wherein the calculating of the variance value comprises:

determining, by the exploration apparatus, a variance of values of the utility function for respective actions of each of the agents, as a variance of an input; and applying, by the exploration apparatus, the variance of the input to an approximate variance propagation algorithm configured to have a deep neural network function as a mapping function, to obtain a variance of an output of the deep neural network function, wherein variance propagation at each layer of the deep neural network function is performed using a Jacobian matrix for respective layers of the deep neural network function.

2. The method of claim 1, further comprising:

transitioning to a next state after each agent has taken the selected action in the current state;

reflecting a reward for the selected action to the utility function of a corresponding agent; and performing the calculating of the variance value of the joint value function, the calculating of the linear sum, and the obtaining of the sample.

3. An exploration apparatus for exploring training samples used in learning action policy applied to actions of a plurality of agents included in a multi-agent reinforcement learning system, the plurality of agents configured to perform actions according to the learned action policy, and receive rewards for the actions performed, the exploration apparatus comprising:

an information obtainer that obtains observation information and action information of each agent;

an agent influence calculator that calculates, in a current state and while a selected action of a target agent is fixed, a variance value of a joint value function for actions of other agents, the joint value function configured to estimate an expected return of cumulative reward by taking, as inputs, observation information, action information, and reward values of all agents; and an action explorer that calculates a linear sum of the value of the utility function of the target agent and the variance value of the joint value function for the actions of the other agents calculated for a selected action of each agent, and obtains a sample to be used for training an action policy of each agent by probabilistically selecting an action in which the linear sum is a maximum, and a random action, the utility function configured, for each agent, to estimate an expected return of cumulative reward using only observation information of respective agents as an input, wherein the action explorer is configured to:

determine a variance of values of the utility function for respective actions of each of the agents, as a variance of an input, and apply the variance of the input to an approximate variance propagation algorithm configured to have a deep neural network function as a mapping function, to obtain a variance of an output of the deep neural network function, wherein variance propagation at each layer of the deep neural network function is performed using a Jacobian matrix for respective layers of the deep neural network function.

4. The exploration apparatus of claim 3, wherein the information obtainer, the agent influence calculator, and the action explorer are sequentially and repeatedly executed according to a state transition of each agent in a training process.

* * * * *